United States Patent [19]

Gitzendanner

[11] Patent Number: 4,620,248
[45] Date of Patent: Oct. 28, 1986

[54] APPARATUS FOR CONTROLLING HUMIDITY IN A DISK DRIVE

[75] Inventor: Louis G. Gitzendanner, Oklahoma City, Okla.

[73] Assignee: Magnetic Peripherals Inc., Minneapolis, Minn.

[21] Appl. No.: 646,537

[22] Filed: Sep. 4, 1984

[51] Int. Cl.[4] .................... G11B 5/012; B01F 3/02; G05D 21/00
[52] U.S. Cl. .................... 360/97; 236/44 R; 360/98
[58] Field of Search .................... 360/97, 98, 99, 137; 236/44 R–44 E

[56] References Cited

U.S. PATENT DOCUMENTS

| 2,152,586 | 3/1939 | Freeman | 172/36 |
| 3,859,616 | 1/1975 | Ladany | 236/44 C |
| 4,307,425 | 12/1981 | Kaneko et al. | 360/98 |
| 4,418,369 | 11/1983 | Applequist et al. | 360/98 |
| 4,429,336 | 1/1984 | Berube et al. | 360/97 |

OTHER PUBLICATIONS

Wheeler, S. E. Atmospheric Pressure Compensator for Disk Files IBM Technical Disclosure Bulletin, vol. 20, No. 5, (Oct. 1977), pp. 1891–1892.

Primary Examiner—Robert S. Tupper
Assistant Examiner—Melissa T. Koval
Attorney, Agent, or Firm—Joseph A. Genovese; Robert M. Angus

[57] ABSTRACT

A disk drive is provided with a vent tube which is long (i.e., 20 inches) compared to its bore (i.e., 0.013 inch) to minimize diffusion of water vapor into the drive without seriously affecting pressure gradients along the length. Minimum bore diameters are given for specified lengths of vent tube. Conveniently, a desiccant is employed with a heater to absorb water vapor admitted to the drive and to expel water vapor when the drive is operated. A thermally-operated valve is also employed to expel water vapor when the drive operates. The desiccant may be employed in a chamber separated from the disk chamber, whereupon pressure valves are provided to adjust the pressures in the drive.

17 Claims, 1 Drawing Figure

U.S. Patent  Oct. 28, 1986  4,620,248
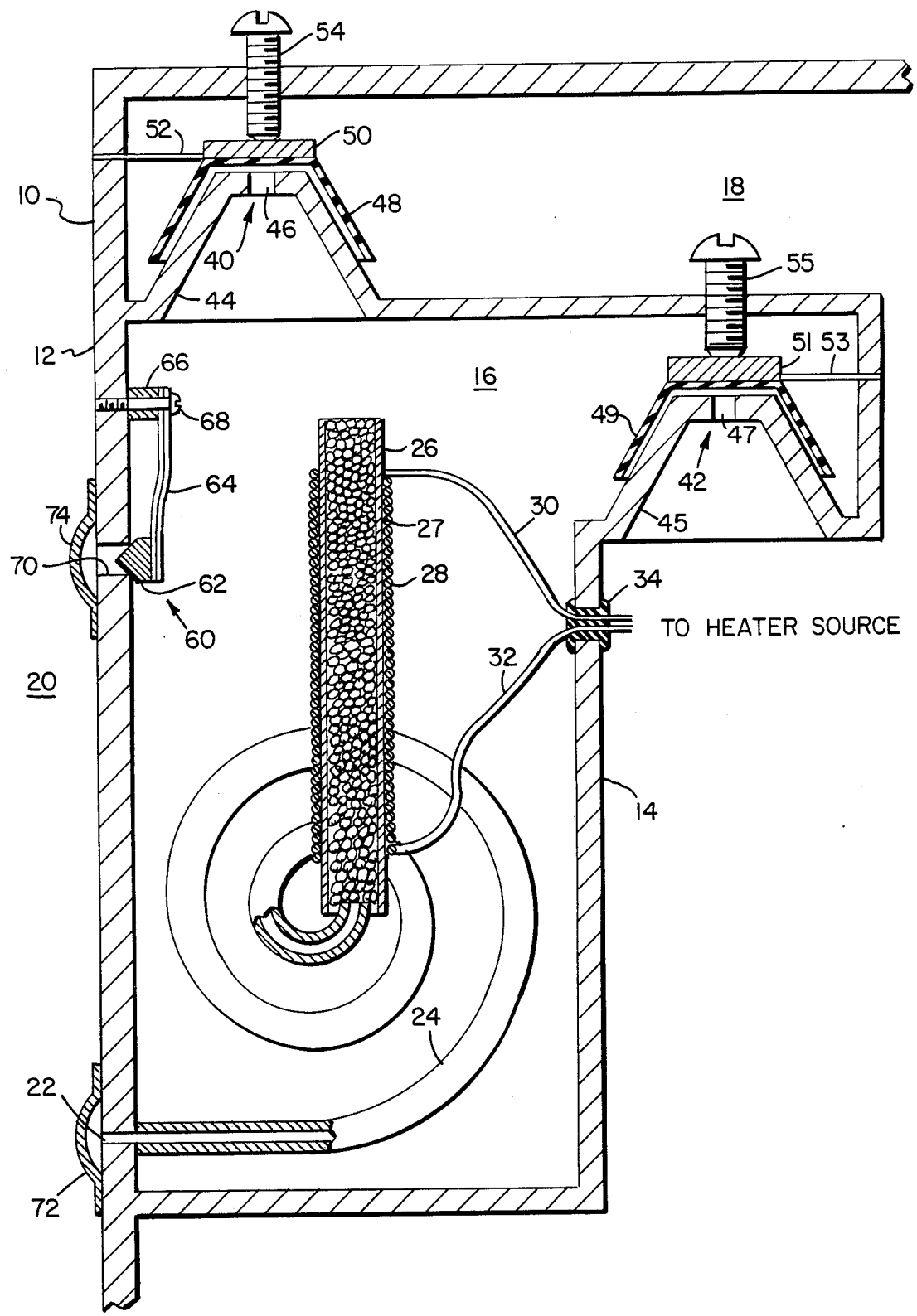

APPARATUS FOR CONTROLLING HUMIDITY IN A DISK DRIVE

Many magnetic disk drives containing fixed media permit the flying heads to land on the disk when the disk is stopped, rather than retracting heads from the disk while it is still rotating. However, if the heads rest on the disk, humidity within the drive causes stiction between the heads and the disk, impeding restart of the disk drive. Damage to the disk and head can occur upon restart under conditions of high stiction.

One technique for reducing humidity within the disk drive is to construct the drive so that the disk is in a sealed compartment, and a desiccant is provided within the compartment to absorb water vapor. However, pressure changes both inside and outside the compartment could damage the fluid shaft seal on the spindle motor if the pressure differential exceeds, typically, about 0.75 inches of mercury (0.4 psi). Therefore, a vent is necessary to equilibrate pressure between the inside and outside of the drive.

As the disk drive heats up during periods of usage and cools down during periods of nonusage, air is exhausted and ingested through the vent. As air is ingested during cooling down periods, water vapor may be carried into the disk drive. Further, if the partial pressure of water vapor within the drive is less than the partial pressure of water vapor in the atmosphere surrounding the drive, water vapor will diffuse into the drive through the vent.

One successful humidity control has been the employment of a desiccant within the disk drive in sufficient quantity as to absorb part of the water vapor ingested into the drive during cool-down periods. When the air and desiccant are in moisture equilibrium, the relative humidity of the air may be expressed as a function of the amount of water in the desiccant (per unit weight of desiccant). Therefore, for a given quantity of desiccant, the number of cool-down cycles available before the relative humidity of the air exceeds a predetermined value is limited. For example, if a disk drive operates in an atmosphere of 90% relative humidity at 86° F. (30° C.), one cubic inch of desiccant would control relative humidity to below 30% through approximately 1,300 cool-down cycles. Each time the drive cycles on and off, it will go through a thermal excursion of about 50° F. Thus, on cooling down, a drive might breath in approximately four cubic inches of air containing about 1.8 millgrams of water. Considering only moisture ingested during cool-down cycles (i.e., neglecting moisture entering by diffusion), one cubic inch of commercially available desiccant, capable of absorbing approximately 2.4 grams of water, will maintain the air in the drive below 30% relative humidity for approximately 1,300 cycles. After 1300 cycles, the desiccant/air moisture equilibrium will exceed 30% relative humidity, and the relative humidity in the drive will exceed 30%.

The present invention is concerned with apparatus for maintaining a reasonably low humidity within a magnetic disk drive. Particularly, it is an object of the present invention to provide apparatus within a magnetic disk drive for controlling the humidity to acceptably low limits through repeated thermal excursion cycles.

Another object of the present invention resides in the provision of apparatus for inhibiting moisture diffusion into the drive, as well as for encouraging expelling moisture from the drive to maintain relative humidity to acceptably low limits.

The invention includes the provision of a long vent tube providing fluid communication between the inside and exterior of the disk drive. In one aspect of the invention, a desiccant is provided at the interior end of the vent tube. The desiccant may be provided with a heater so that water vapor absorbed by the desiccant may be expelled with air when the air pressure within the disk drive is higher than external pressures.

In another aspect of the invention, a thermally-operated vent valve, in parallel with the vent tube, permits venting to the atmosphere when the drive is heated.

One feature of the present invention resides in the provision of a two-way pressure relief valve to permit pressure within the disk drive to rise and fall somewhat above and below the atmospheric pressure without equilibrium through the vent tube.

The above and other features of this invention will be more fully understood from the following detailed description and the accompanying drawing in which the sole FIGURE is a side view diagram, partially cutaway cross-section, of apparatus in accordance with the presently preferred embodiment of the present invention.

The drawing illustrates a housing 10 having an external wall 12 forming a chamber 18, and an internal wall 14 forming a chamber 16 therein. Chamber 16 is separated by wall 14 from chamber 18, chamber 18 forming the main chamber portion of the disk drive where the disk media is located. External wall 12 seals both chambers 16 and 18 from the external atmosphere shown at 20.

Port 22 is provided through wall 12 to provide fluid communication between the atmosphere at 20 and the internal bore of tube 24, positioned within chamber 16. The free end of tube 24 is in fluid communication with the interior bore of tube 26, filled of a suitable desiccant 27 such as granular silica gel, the free end of which is open to chamber 16. Tube 26 and dessicant 27 are hereafter referred as a desiccant tube. Heater coil 28 is wound about the periphery of desiccant tube 26 with leads 30 and 32 being connected through seal 34 to the electronic portions of the disk drive. Tube 26 is preferably constructed of a thermally conductive metal so heat from coil 28 is transferred to desiccant 27. The heater may be operated whenever the drive is operated or may be operated under the control of a time-delay switch, microprocessor, or other control within the drive electronics (not shown). Tube 24 may be configured in any convenient shape within chamber 16, but it is important that the length of tube 24 be great compared to its diameter.

Pressure valves 40 and 42 provide fluid communication between chambers 16 and 18, the latter containing the principal portions of the disk drive. Valve 40 is operable when the pressure within chamber 16 exceeds the pressure within chamber 18 by a design amount, such as about 0.3 psi, whereas valve 42 is operable to provide fluid communication when the pressure within chamber 18 exceeds that within chamber 16 by design amount, such as about 0.3 psi. One convenient design for valves 40 and 42 is to provide frustoconical portions to wall 14 at 44, and 45, each having an aperture 46 and 47. Cone members 48 and 49, constructed of suitable rubber or other sealing material, are fastened to members 50 and 51, suspended by leaf springs 52 and 53 to wall 14. Threaded fasteners 54 and 55 provide suitable stops for members 50 and 51 to regulate a maximum opening of the valves. Members 48 and 49 are biased by springs 52 and 53 to be normally closed against apertures 46 and 47. When the pressure within one of chamber 16 and 18 exceeds the pressure in the other chamber by a design amount (eg. 0.3 psi), one of the valves opens to permit adjustment of the relative pressures.

Needle valve 60 is provided in the wall 12 between chamber 16 and the atmosphere at 20. Needle valve 60 comprises a needle 62 mounted to a bi-metal strip 64 fastened by housing 66 to wall 12 by means of fastener 68. Needle 62 is operable to open and close port 70 in wall 14. When the temperature within chamber 16 exceeds a design amount, bi-metal strip 64 operates to open valve 60 to establish fluid communication between chamber 16 and the atmosphere, without need to flow through tubes 24 and 26.

Filters 72, 74 are fastened to wall 12 over ports 22 and 70 to prevent dust and other solid contaminants from entering ports.

The present invention resides in the provision of apparatus for removing water vapor from a disk drive or for preventing water vapor from entering the disk drive, as well as to a combination of these apparatus for optimum water vapor control. Thus, the pair of pressure operable valves 40 and 42 serve to seal the disk drive compartments from chamber 16 and the atmosphere when the valves are closed, yet are operable to prevent the pressure differential between the atmosphere and the disk drive chamber from exceeding a design amount. As a result, less water vapor can diffuse into the drive chamber. Desiccant tube 26 is operable to absorb water vapor in the disk drive, and heater 28 is operable to expel water from the desiccant to the atmosphere. Needle valve 60 is operable to open only when the temperature within the disk drive rises (at a sensing location) above a design limit such as 160° F. Since the vapor pressure of matter tends to rise with temperature, at 160° F. the vapor pressure of water in the drive exceeds that outside the drive, resulting in diffusion of water vapor from chamber 16 through needle valve 60 to the atmosphere. This action tends to dry out the desiccant, chamber 16, and chamber 18 (if valve 42 is open).

Tube 24 is a long tube designed to permit the pressure within chamber 16 to remain essentially at the same pressure as the ambient pressure surrounding housing 10, yet permit as small as practical diffusion of water vapor between the surrounding atmosphere and chamber 16. It can be shown that the pressure differential through a tube is proportional to the length of the tube divided by the fourth power of its internal diameter (bore):

$$\Delta P \approx l/d^4$$

On the other hand, the diffusion mass flow rate of water vapor through dry air in a tube is proportional to the square of the internal diameter (bore) of the tube divided by its length:

$$\Delta Q \approx d^2/l$$

It is desirable to maintain both the pressure differential, $\Delta P$, and the mass flow rate of water vapor, $\Delta Q$, as low as possible. It is evident that for a given length of tube, doubling the diameter will reduce the pressure differential by a factor of 16 but will increase the mass flow rate of water vapor by a factor of only 4. Conversely, lengthening a tube will increase the pressure differential and decrease the mass flow rate of water vapor in equal proportions. Therefore, for a given set of parameters associated with a given tube, if the length is increased by 16-fold and the diameter is doubled, the mass flow rate of water vapor by diffusion will be decreased by a factor of 4 while the pressure differential is unchanged.

It is evident, therefore, that the tube 24 should be as long as practical and have a diameter great enough as to not create a serious pressure differential. Under the conditions stated, when valves 40 and 42 are used to operate at pressures of 0.3 psi, it is desireable that the pressure differential along tube 24 not exceed 0.1 psi. Assuming a maximum rate of air expulsion of 5 cubic inches per hour due to thermal excursions of the drive, to maintain a pressure differential smaller than 0.1 psi, a tube 10 inches in length should have a bore no smaller than 0.011 inch; a tube 20 inches in length should have a bore no smaller than 0.013 inch. Tubes with bores greater than minimum may be used, recognizing that a sacrifice of water vapor diffusion will occur. For example, I have found that ordinary surgical tubing (with a bore of about $\frac{1}{8}$ inch diameter) and a length of about 20 to 30 inches will be quite adequate in most applications. (Recognizing that disk drives employ disks with diameters of 5.25 inches, the length of the vent tube will ordinarily be greater than the diameter of the disk.) In any event, plastic and metal tubing with bores as small as 0.01 inch are commercially available and are suitable vent tubes. The granular structure of the desiccant should be chosen so that adequate fluid communication passes through tube 26.

It is known that as the disk media rotates within the disk drive, air currents generated by the rotating disk create pressure changes in the housing. It is preferred that the free end of desiccant tube 26 be located in a location within the drive housing where tubes 24 and 26 are unaffected by pressure changes caused by rotation of the disk. Conveniently, the separation of region 16 where the tube terminates from region 18 where the disk is located accomplishes this. The principal features of vent tube 24 are that it should have an internal bore large enough that the effects of surface tension and friction between air and water flowing in the tube and the surface of the tube are not significant and the flow of air and water vapor is substantially laminar, and the tube should be long enough as to minimize the mass flow rate of water vapor through the tube. The tube must not be a capillary tube.

The present invention provides convenient technique for minimizing diffusion of water vapor into a disk drive and for expelling water vapor from the disk drive. The vent tube employed should be long and have a diameter large enough to avoid an excessive pressure drop from developing due to flow in the tubes. Conveniently, commercially available tubing having bores of the order of 0.01 inch and greater may be used in lengths of 10 inches and greater. The length and diameter of the tube is in part restricted only by their relationship to each other (given the constraints stated herein) and the volume of space within the disk drive within which to place the tube.

This invention is not to be limited by the embodiment shown in the drawing and described in the description, which is given by way of example and not of limitation, but only in accordance with the scope of the appended claims.

What is claimed is:

1. In a disk drive having a housing forming an interior chamber containing a disk and one or more heads for reading and/or writing data on said disk, said disk being rotatable in relation to said heads, the improvement comprising:

a vent tube having a first end outside said housing and a second end in said interior chamber within said housing, said vent tube providing fluid communication between said interior chamber of said housing and atmosphere outside said housing, said vent tube being characterized by having an internal bore large enough so that effects of surface tension and friction between air and water vapor flowing in the vent tube and the surface of the bore of said vent tube are not significant so that flow of air and water vapor in the vent tube is substantially laminar and capillary effects are not significantly present, said vent tube being further characterized by a length long enough to minimize the mass flow rate of water vapor from said atmosphere to said interior chamber, said vent tube being further characterized that pressure gradient across the length of said vent tube is no greater than 0.1 psi; and a desiccant tube within said internal chamber, said desiccant tube being connected to said second end of said vent tube in fluid communication with said internal bore of said vent tube, said dessicant tube containing a desiccant material which absorbs water.

2. Apparatus according to claim 1 further including heater means operatively associated with said desiccant tube for heating said desiccant material to expel water vapor therefrom, and means for operating said heater means.

3. Apparatus according to claim 1 further including a port providing fluid communication between said interior chamber of said housing and said atmosphere outside said housing, valve means for opening and closing fluid communication through said port, and thermally-responsive valve operator means responsive to temperature within said interior chamber of said housing for operating said valve means to open fluid communication through said port when the temperature within said interior chamber of said housing exceeds a design level and to close fluid communication through said port when the temperature within said interior chamber of said housing is less than said design level, whereby fluid may be expelled from within said housing through said port when the temperature within said interior chamber of said housing exceeds said design level.

4. Apparatus according to claim 3 further including heater means operably associated with said desiccant tube for heating said desiccant material to expel water vapor therefrom, and means for operating said heater means.

5. Apparatus according to claim 1 wherein said housing contains a first interior chamber containing said disk and heads a second interior chamber, said vent tube and said desiccant tube providing fluid communication between said second interior chamber and said atmosphere outside said housing, said apparatus further comprising first and second pressure valve means for selectively providing fluid communication between said first and second interior chambers, first pressure-responsive valve operator means responsive to fluid pressure in said first and second interior chambers for opening said first pressure valve means when the fluid pressure in said first interior chamber exceeds the fluid pressure in said second interior chamber by a first design level and for closing said first pressure valve means when the fluid pressure in said first interior chamber does not exceed the fluid pressure in said second interior chamber by said first design level, and second pressure-responsive valve operator means responsive to fluid pressure in said first and second interior chambers for opening said second pressure valve means when the fluid pressure in said second interior chamber exceeds the fluid pressure in said first interior chamber by a second design level and for closing said second pressure valve means when the fluid pressure in said second interior chamber does not exceed the fluid pressure in said first interior chamber by said second design level.

6. Apparatus according to claim 5 further including heater means operatively associated with said desiccant tube for heating said desiccant material to expel water vapor therefrom, and means for operating said heater means.

7. Apparatus according to claim 5 further including a port providing fluid communication between said second interior chamber and the atmosphere outside said housing, third valve means for opening and closing fluid communication through said port, and thermally-responsive valve operator means responsive to temperature within said second interior chamber for operating said third valve means to open fluid communication through said port when the temperature within said second interior chamber exceeds a design level and to close fluid communication through said port when the temperature within said second interior chamber is less than said design level, whereby fluid may be expelled from within said second interior chamber through said port when the temperature within said second interior chamber exceeds said design level.

8. Apparatus according to claim 7 further including heater means operatively associated with said desiccant tube for heating said desiccant material to expel water vapor therefrom, and means for operating said heater means.

9. In a disk drive having a housing forming an interior chamber containing a disk and one or more heads for reading and/or writing data on said disk, said disk being rotatable in relation to said heads, the improvement comprising:

a vent tube having a first end outside said housing and a second end in said interior chamber within said housing, said vent tube providing fluid communication between said interior chamber of said housing and atmosphere outside said housing, said tube being characterized by having an internal bore large enough so that effects of surface tension and friction between air and water vapor flowing in the vent tube and the surface of the bore of said vent tube are not significant so that flow of air and water vapor in the vent tube is substantially laminar and capillary effects are not significantly present, said vent tube being further characterized by a length long enough to minimize the mass flow rate of water vapor from said atmosphere to said interior chamber, said vent tube being further characterized that pressure gradient across the length of said vent tube is no greater than 0.1 psi; and a port providing fluid communication between said interior chamber of said housing and the atmosphere surrounding said housing, valve means for opening and closing fluid communication through said port, and thermally-responsive valve operator means responsive to temperature within said interior chamber for operating said valve means to open fluid communication through said port when the temperature within said interior chamber exceeds a design level and to close fluid communication through said port when the temperature within said interior chamber is less than said design level, whereby fluid may be expelled from within said interior chamber through said port when the temperature within said interior chamber exceeds said design level.

10. Apparatus according to claim 9 wherein said housing contains a first interior chamber containing said disk and heads and a second interior chamber, said vent tube and said port providing fluid communication between said second interior chamber and the atmosphere outside said housing, said apparatus further comprising first and second pressure valve means for selectively providing fluid communication between said first and second interior chambers, first pressure-responsive valve operator means responsive to fluid pressure within said first and second interior chambers for operating said first pressure valve means when the fluid pressure in said first interior chamber exceeds the fluid pressure in said second interior chamber by a first design level and for closing said first pressure valve means when the fluid pressure in said first interior chamber does not exceed the fluid pressure in said second interior chamber by said first design level, and second pressure-responsive valve operator means responsive to fluid pressure in said first and second interior chambers for opening said second pressure valve means when the fluid pressure in said second interior chamber exceeds the fluid pressure in said first interior chamber by a second design level and for closing said second pressure valve means when the fluid pressure in said second interior chamber does not exceed the fluid pressure in said first interior chamber by said second design level.

11. In a storage device having a housing enclosing a rotatable storage media, a vent tube having an end outside said housing and an end at an interior region within said housing, said vent tube providing fluid communication between atmosphere outside said housing and said interior region within said housing, said vent tube being characterized by having an internal bore large enough so that effects of surface tension and friction between air and water vapor flowing in the vent tube and the surface of the bore of said vent tube are not significant so that flow of air and water vapor in the vent tube is substantially laminar and capillary effects are not significantly present, said vent tube being further characterized by a length long enough to minimize the mass flow rate of water vapor from said atmosphere to said interior region, said vent tube being further characterized that pressure gradient across the length of said vent tube is no greater than 0.1 psi.

12. Apparatus according to claim 11 wherein said bore of said vent tube has a diameter of at least 0.011 inch and the length of said vent tube is at least 10 inches.

13. Apparatus according to claim 11 wherein the bore of said vent tube has a diameter of the order of 0.013 inch and the length of said vent tube is of the order of 20 inches.

14. Apparatus according to claim 11 wherein said rotatable storage media has a diameter, and the length of said tube is greater than the diameter of said rotatable storage media.

15. Apparatus according to claim 11 wherein said interior region is located within said housing at a location unaffected by pressure changes in said housing caused by rotation of said storage media.

16. In a disk drive having a housing forming a first internal chamber and a second internal chamber, said first internal chamber containing a disk and one or more heads for reading and/or writing data on said disk, said disk being rotatable in relation to said heads, the improvement comprising:

a vent tube having an internal bore providing fluid communication between said second interval chamber of said housing and atmosphere surrounding said housing, said tube being characterized by having a length which is great compared to the diameter of said internal bore;

a desiccant tube within said second internal chamber, said dessicant tube being connected to the end of said vent tube in said second internal chamber in fluid communication with said internal bore of said vent tube, said desiccant tube containing a desiccant material which absorbs water;

first and second pressure valve means for selectively providing fluid communication between said first and second interior chambers, first pressure-responsive valve operator means responsive to fluid pressure in said first and second interior chambers for opening said first pressure valve means when the fluid pressure in said first internal chamber exceeds the fluid pressure in said second internal chamber by a first design level and for closing said first pressure valve means when the fluid pressure in said first internal chamber does not exceed the fluid pressure in said second internal chamber by said first design level, and second pressure-responsive valve operator means responsive to fluid pressure in said first and second internal chambers for opening said second pressure valve means when the fluid pressure in said second internal chamber exceeds the fluid pressure in said first internal chamber by a second design level and for closing said second pressure valve means when the fluid pressure in said second internal chamber does not exceed the fluid pressure in said first internal chamber by said second design level; and a port providing fluid communication between said second interior chamber and the atmosphere outside said housing, third valve means for opening and closing fluid communication through said port, and thermally-responsive valve operator means responsive to temperature within said second internal chamber for operating said third valve means to open fluid communication through said port when the temperature within said second internal chamber exceeds a design level and to close fluid communication through said port when the temperature within said second internal chamber is less than said design level, whereby fluid may be expelled from said internal chamber through said port when the temperature within said second internal chamber exceeds said design level.

17. Apparatus according to claim 16 further including heater means operatively associated with said desiccant tube for heating said desiccant material to expel water vapor therefrom, and means for operating said heater means.

* * * * *